United States Patent
Jung et al.

(10) Patent No.: US 8,442,571 B2
(45) Date of Patent: May 14, 2013

(54) METHOD AND APPARATUS FOR SUPPORTING CSG SERVICE IN WIRELESS COMMUNICATION SYSTEM BASED ON ACCESS MODE

(75) Inventors: SungHoon Jung, Seoul (KR); SungDuck Chun, Seoul (KR); Seungjune Yi, Seoul (KR); Young Dae Lee, Seoul (KR); Sung Jun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 493 days.

(21) Appl. No.: 12/727,142

(22) Filed: Mar. 18, 2010

(65) Prior Publication Data

US 2010/0240349 A1    Sep. 23, 2010

Related U.S. Application Data

(60) Provisional application No. 61/161,845, filed on Mar. 20, 2009.

(30) Foreign Application Priority Data

Mar. 16, 2010    (KR) ......................... 10-2010-0023320

(51) Int. Cl.
*H04W 48/00* (2009.01)
*H04W 12/00* (2009.01)
*H04W 76/02* (2009.01)
*H04W 72/02* (2009.01)
*H04W 60/00* (2009.01)

(52) U.S. Cl.
USPC ........ 455/518; 455/411; 455/436; 455/435.2; 455/525

(58) Field of Classification Search .................. None
See application file for complete search history.

(56) References Cited

U.S. PATENT DOCUMENTS

| | | | |
|---|---|---|---|
| 2009/0047960 A1* | 2/2009 | Gunnarsson et al. | 455/436 |
| 2009/0094351 A1* | 4/2009 | Gupta et al. | 709/220 |
| 2009/0168727 A1* | 7/2009 | Somasundaram et al. | 455/435.2 X |
| 2010/0069119 A1* | 3/2010 | Mueck et al. | 455/561 |

* cited by examiner

*Primary Examiner* — Philip Sobutka
(74) *Attorney, Agent, or Firm* — Lee, Hong, Degerman, Kang & Waimey (57) ABSTRACT

A method and apparatus for supporting a closed subscriber group (CSG) service is provided. A user equipment transmit a CSG member indicator to a base station when requesting access to the base station. The CSG member indicator indicates CSG membership of the user equipment. The base station may determine whether the user equipment accesses it as a CSG member or as a non-CSG member.

13 Claims, 9 Drawing Sheets

METHOD AND APPARATUS FOR SUPPORTING CSG SERVICE IN WIRELESS COMMUNICATION SYSTEM BASED ON ACCESS MODE

CROSS-REFERENCE TO RELATED APPLICATIONS

This application claims the benefit of U.S. Provisional Application Serial No. 61/161,845 filed on Mar. 20, 2009, and also claims the benefit of earlier filing date and right of priority to Korean Patent Application No. 10-2010-0023320 filed on Mar. 16, 2010, the contents of all of which are incorporated by reference in their entirety herein.

BACKGROUND OF THE INVENTION

1. Field of the Invention

The present invention relates to wireless communications, and more particularly, to a method and apparatus for supporting a closed subscriber group (CSG) service in a wireless communication system.

2. Related Art

The Third Generation Partnership Project (3GPP) Long Term Evolution (3GPP LTE) which is a set of enhancements to the Universal Mobile Telecommunications System (UMTS) is introduced as 3GPP Release 8. The 3GPP LTE uses orthogonal frequency division multiple access (OFDMA) for the downlink, and single carrier frequency division multiple access (SC-FDMA) for the uplink, and adopts multiple input multiple output (MIMO) with up to 4 antennas. Research is now underway on 3GPP LTE-Advanced (LTE-A), which is a major enhancement to 3GPP LTE.

Closed subscriber group (CSG) services, which are services that can be provided only to a certain group of subscribers, have been introduced to improve quality of service. A base station (BS) capable of providing CSG services is referred to as a Home eNodeB (HNB), and a cell serving CSG members is referred to as a CSG cell. The basic requirements regarding CSG services are as disclosed in 3GPP TS 22.220 V1.0.1 (2008-12) "Service requirements for Home NodeBs and Home eNodeBs (Release 9)".

Given that most CSG services are provided at higher costs than other typical wireless communication services, it is important to guarantee the quality of CSG services.

There is a need for a method and apparatus to improve the quality of CSG services.

SUMMARY OF THE INVENTION

The present invention provides a method and apparatus for supporting a closed subscriber group (CSG) service in a wireless communication system.

The present invention also provides a method and apparatus for providing CSG subscription information in a wireless communication system.

In an aspect, a wireless apparatus for supporting a closed subscriber group (CSG) service in a wireless communication system is provided. The apparatus includes a radio frequency (RF) unit configured to transmit and receive radio signals, a memory configured to store a CSG white list including a list of CSGs to be subscribed; and a processor configured to be operatively coupled to the RF unit and the memory and to implement a radio interface protocol, wherein the processor is configured to transmit a CSG member indicator to a base station (BS) when requesting access to the BS, the CSG member indicator indicating CSG membership.

The processor may be configured to acquire CSG-related information including a CSG indicator and a CSG identity (ID) from the BS, and transmit the CSG member indicator to the BS if a CSG corresponding to the CSG ID is included in the CSG white list.

The BS may operate in a hybrid mode.

The processor may be configured to determine that an access mode of the BS is the hybrid mode based on a combination of the CSG Indicator and the CSG ID.

The CSG member indicator may be included in at least one of a radio resource control (RRC) connection setup request message, an RRC connection setup complete message, an RRC connection re-establishment request message and an RRC connection re-establishment complete message.

In another aspect, a method of supporting a closed subscriber group (CSG) service in a wireless communication system is provided. The method includes acquiring, at a user equipment (UE), CSG-related information including a CSG indicator and a CSG identity (ID) from a base station (BS), and transmitting, at the UE, a connection request message including a CSG member indicator to the BS, the CSG member indicator indicating that the UE is a member of a CSG corresponding to the CSG ID.

In still another aspect, a base station (BS) for supporting a closed subscriber group (CSG) service in a wireless communication system is provided. The BS includes a radio frequency (RF) unit configured to transmit and receive radio signals, and a processor configured to be operatively coupled to the RF unit and to implement a radio interface protocol, wherein the processor is configured to transmit CSG-related information including a CSG indicator and a CSG identity (ID), receive from a user equipment (UE) a access request message including a CSG member indicator indicating that the UE is a member of a CSG corresponding to the CSG ID, and determine whether to accept the UE's access request based on the CSG member indicator.

When a UE tries to access a BS, the BS may determine whether the UE accesses it as a CSG member UE or as a non-CSG member UE. In a stage of cell access, CSG member UEs may be prioritized over non-CSG member UEs.

A network supporting a CSG service may provide higher QoS to CSG member UEs than to non-CSG member UEs.

DESCRIPTION OF EXEMPLARY EMBODIMENTS

Figure 1:
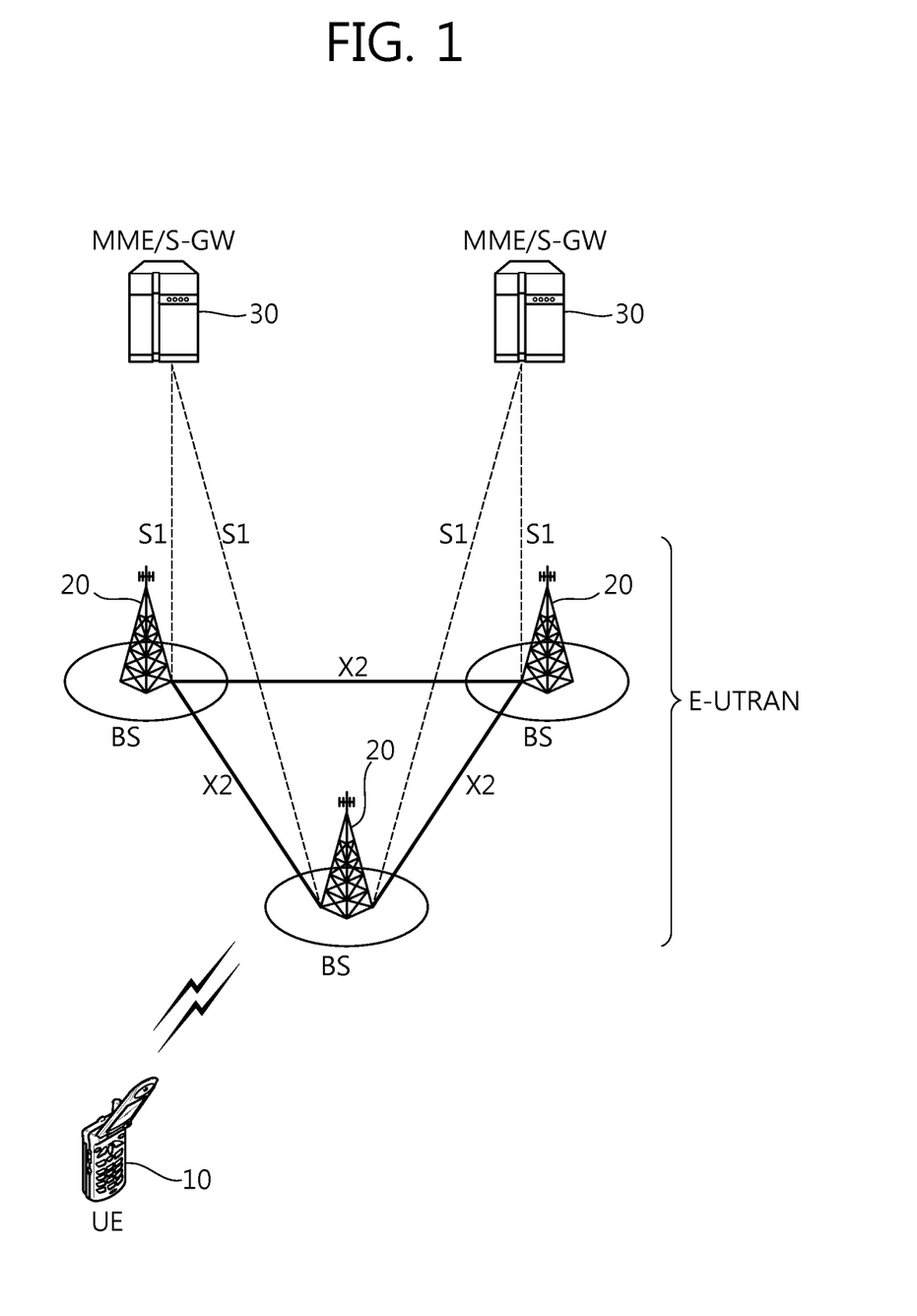
FIG. 1 is a view illustrating a mobile communication system to which the present invention are applied.

FIG. 1 is a view illustrating a mobile communication system to which the present invention are applied. This system may be also referred to as an Evolved-UMTS Terrestrial Radio Access Network (E-UTRAN) or a Long Term Evolution (LTE)/LTE-advanced (LTE-A) system.

The E-UTRAN includes at least one base station (BS) 20 providing a user plane and a control plane towards a user equipment (UE) 10. The UE can be fixed or mobile and can be referred to as another terminology, such as a MS (Mobile Station), a UT (User Terminal), a SS (Subscriber Station), MT (mobile terminal), a wireless device, or the like. The BS 20 may be a fixed station that communicates with the UE 10 and can be referred to as another terminology, such as an e-NB (evolved-NodeB), a BTS (Base Transceiver System), an access point, or the like.

The BSs 20 are interconnected with each other by means of an X2 interface. The BSs 20 are also connected by means of the S1 interface to the EPC (Evolved Packet Core) 30, more specifically to the Mobility Management Entity (MME) by means of the S1-MME and to the Serving Gateway (S-GW) by means of the S1-U.

The EPC 30 may include the MME, the S-GW, and a Packet Data Network-Gateway (P-GW). The MME has information on the connection of UE or the capability of UE, and such information is primarily used for the mobility management of the UE. The S-GW is a gateway having E-UTRAN as an end point, and the P-GW is a gateway having PDN as an end point.

The radio interface protocol layers between UE and a network can be divided into a first layer (L1), a second layer (L2) and a third layer (L3) based on three lower layers of an Open System Interconnection (OSI) reference model widely known in communications systems. A physical layer belonging to the first layer provides information transfer services using a physical channel, and a radio resource control (RRC) layer located at the third layer plays a role of controlling radio resources between UE and a network. For the purpose of this, the RRC layer exchanges RRC messages between UE and a network.

Figure 2:
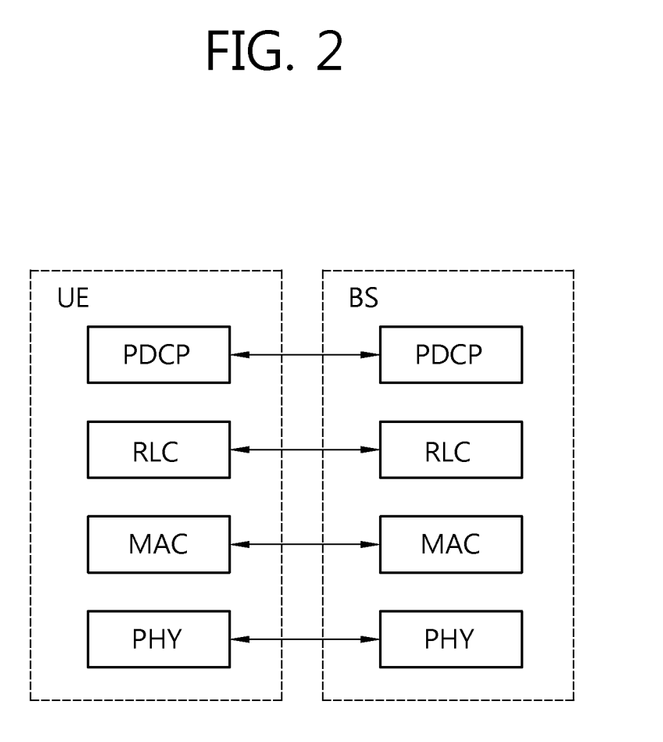
FIG. 2 is a block diagram showing radio protocol architecture for a user plane.
Figure 3:
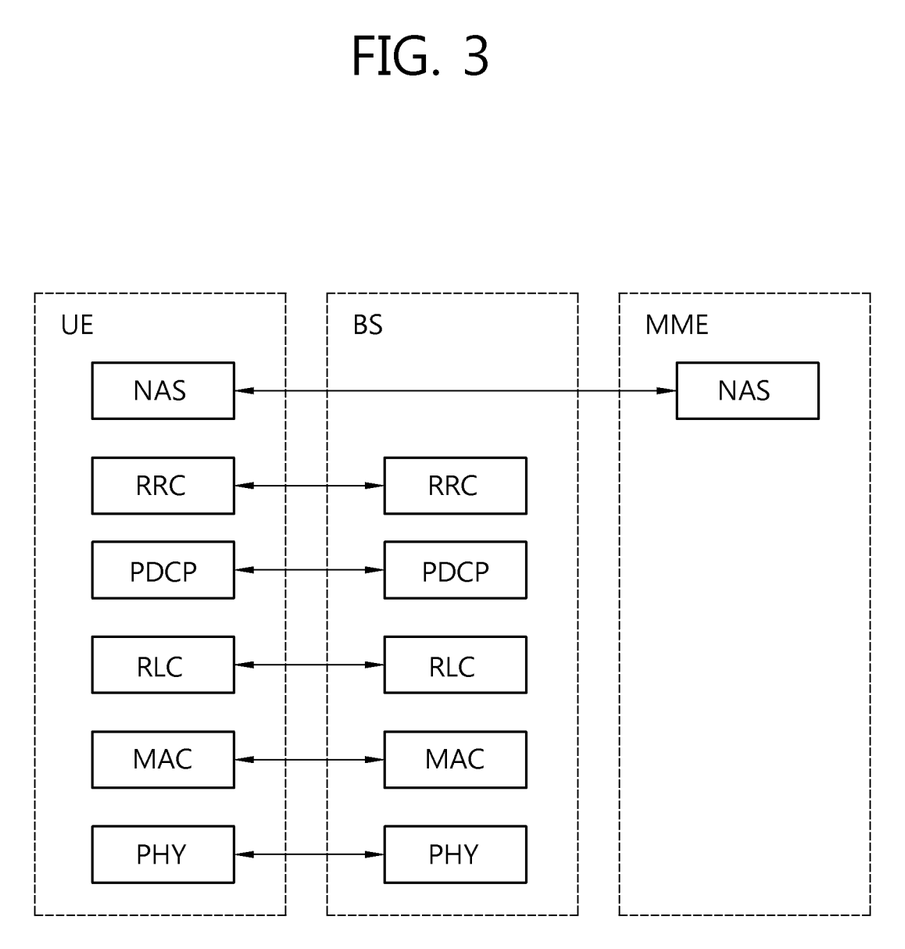
FIG. 3 is a block diagram showing radio protocol architecture for a control plane.

FIG. 2 is a block diagram showing radio protocol architecture for a user plane. FIG. 3 is a block diagram showing radio protocol architecture for a control plane. The data plane is a protocol stack for user data transmission and the control plane is a protocol stack for control signal transmission.

Referring to FIGS. 2 and 3, a physical (PHY) layer provides information transfer services to upper layers on a physical channel. The PHY layer is coupled with a MAC (Medium Access Control) layer, i.e., an upper layer of the PHY layer, through transport channels. Data is transferred between the MAC layer and the PHY layer through the transport channel. The transport channels are classified by how and with what characteristics data are transferred over the radio interface.

Between different physical layers, i.e., the physical layer of a transmitter and the physical layer of a receiver, data are transferred through the physical channel. The physical channel may be modulated by an Orthogonal Frequency Division Multiplexing (OFDM) scheme, and time and frequency are used as radio resources for the physical channel.

The functions of the MAC layer include mapping between logical channels and transport channels, and multiplexing/demultiplexing of MAC SDUs (Service Data Units) belonging to one or different logical channels into/from transport blocks (TBs) delivered to/from the PHY layer on transport channels. The MAC layer provides services to a RLC (Radio Link Control) layer through logical channels.

The functions of the RLC layer include concatenation, segmentation and reassembly of RLC SDUs. In order to guarantee various quality of services (QoSs) required by radio bearers (RBs), the RLC layer provides three operating modes: TM (Transparent Mode), UM (Unacknowledged Mode) and AM (Acknowledged Mode). The AM RLC provides error correction through automatic repeat request (ARQ).

The functions of a Packet Data Convergence Protocol (PDCP) layer for the user plane include transfer of user data, header compression/decompression and ciphering/deciphering. The functions of the PDCP layer for the control plane include transfer of control plane data, and ciphering and integrity protection.

A Radio Resource Control (RRC) layer is defined only in the control plane. The RRC layer serves to control the logical channels, the transport channels and the physical channels in association with configuration, reconfiguration and release of radio bearers (RBs). A RB means a logical path provided by a first layer (i.e. PHY layer) and second layers (i.e. MAC layer, RLC layer and PDCP layer) for data transmission between a UE and a network. Configuring the RB includes defining radio protocol layers and characteristics of channels to provide a service and defining specific parameters and operation schemes. The RB may be classified into a signaling RB (SRB) and a data RB (DRB). The SRB is used as the path to transfer RRC messages in the control plane and the DRB is used as the path to transfer user data in the user plane.

If an RRC connection is established between a RRC layer of the UE and a RRC layer of the E-UTRAN, then the UE is in an RRC_CONNECTED state. Otherwise, the UE is in an RRC_IDLE state.

Downlink transport channels for transmitting data from a network to UE may include a Broadcast Channel (BCH) for transmitting system information, and a downlink Shared Channel (SCH) for transmitting other user traffic or control messages. In case of traffic or control messages of a downlink multicast or broadcast service, they may be transmitted either via a downlink SCH, or via a separate downlink Multicast Channel (MCH). On the other hand, uplink transport channels for transmitting data from UE to a network may include a Random Access Channel (RACH) for transmitting an initial control message and an uplink Shared Channel (SCH) for transmitting user traffic or control messages.

Logical channels which are located at an upper level of transport channels and mapped to the transport channels may include a Broadcast Control Channel (BCCH), a Paging Control Channel (PCCH), a Common Control Channel (CCCH), a Multicast Control Channel (MCCH), a Multicast Traffic Channel (MTCH), and the like.

A physical channel includes multiple symbols inn time domain and multiple sub-carriers in frequency domain. A sub-frame includes a plurality of symbols in the time domain. A sub-frame includes a plurality of resource blocks each including a plurality of symbols and a plurality of sub-carriers. Also, each sub-frame can use particular sub-carriers of particular symbols (e.g., a first symbol) in the relevant sub-frame for a Physical Downlink Control Channel (PDCCH), that is, a L1/L2 control channel. A Transmission Time Interval (TTI) as a unit time for transmitting data is 1 ms, corresponding to one sub-frame.

Hereinafter, an RRC state and an RRC connection method of UE will be described in detail.

The RRC state refers to whether or not the RRC layer of the UE is logically connected to the RRC layer of the E-UTRAN. If connected, then it is called an RRC_CONNECTED state, and otherwise it is called an RRC_IDLE state. For the UE in an RRC_CONNECTED state, the E-UTRAN can recognize the existence of the relevant UE in a cell unit because there exist an RRC connection thereof, and thus the E-UTRAN can effectively control the UE. On the contrary, for the UE in RRC_IDLE state, the E-UTRAN cannot recognize the relevant UE, and therefore, it is managed by a core network in a tracking area unit, which is a unit larger than a cell. In other words, the existence of the UE in an RRC_IDLE state is only recognized in a large area unit, and therefore, it should be changed to an RRC_CONNECTED state in order to receive typical mobile communication services such as voice or data.

When the UE is initially turned on by a user, the UE first searches for a suitable cell and then is camped in an RRC_IDLE state in the corresponding cell. The UE camped in an RRC_IDLE state makes an RRC connection with the E-UTRAN through an RRC connection procedure when it is required to make an RRC connection, thereby changing the state to an RRC_CONNECTED state. There are several cases when the UE in the RRC_IDLE state is required to make an RRC connection. For example, an uplink data transmission may be required due to a phone call attempt by the user, or the like, or the transmission of a response message may be required in response to a paging message received from the E-UTRAN.

A Non-Access Stratum (NAS) layer belonging to the upper layer of the RRC layer serves to perform session management and mobility management.

In order to manage the mobility of the UE at the NAS layer, both an EPS Mobility Management-REGISTERED (EMM-REGISTERED) state and an EMM-DEREGISTERED state are defined, and both states will be applied to the UE and the MME. The UE is initially in an EMM-DEREGISTERED state, and carries out a process of registering it into the corresponding network through an 'Initial Attach' procedure in order to access a network. If this 'Attach' procedure has been successfully carried out, then the UE and the MME will be in an EMM-REGISTERED state.

In order to manage a signaling connection between the UE and the EPC, both an EPS Connection Management (ECM)-IDLE state and an ECM-CONNECTED state are defined, and the both states will be applied to the UE and the MME. If the UE in an ECM-IDLE state makes an RRC connection with E-UTRAN, then it will be in an ECM-CONNECTED state. If the MME in an ECM-IDLE state makes an S1 connection with E-UTRAN, then it will be in an ECM-CONNECTED state. When the UE is in an ECM-IDLE state, the E-UTRAN has no context information of the UE. Therefore, the UE in an ECM-IDLE state carries out a UE-based mobility procedure such as a cell selection or cell reselection without receiving a command from the network. On the contrary, when the UE is in an ECM-CONNECTED state, the mobility of the UE is managed by a command of the network. If the location of the UE in an ECM-IDLE state is changed from the location that has been recognized by the network, the UE performs a Tracking Area Update procedure to notify the network of the corresponding location of the UE.

Next, system information will be described.

The system information includes essential information for the UE to know in order to access a base station. Therefore, the UE should have received all of the system information prior to accessing the base station, and also should have the latest system information all the time. Furthermore, the base station periodically transmits the system information because the system information should be notified to every UE in a cell.

In the Section 5.2.2 of the 3GPP TS 36.331 V8.4.0 (2008-12) "Radio Resource Control (RRC); Protocol specification (Release 8)", the system information can be divided into Master Information Block (MIB), Scheduling Block (SB) and System Information Block (SIB). The MIB allows the UE to be notified of a physical architecture of the corresponding cell, for example, a bandwidth, and the like. The SB notifies of the transmission information of SIBs, for example, transmission period, and the like. The SIB is a set of mutually-related system information. For example, a certain SIB includes only the information of neighboring cells, and another certain SIB includes only the information of uplink radio channels used by the UE.

In general, network services provided to UE can be divided into three types as follows. Furthermore, the UE may recognize the type of a cell differently based on which service can be received. First, the type of services will be described, and then the type of a cell will be described below.

1) Limited service: This service provides an emergency call and an earthquake and tsunami warning system (ETWS), and may be provided in an acceptable cell.

2) Normal service: This service denotes a public use with general purposes, and may be provided in a suitable or normal cell.

3) Operator service: This service denotes a service for communication network service providers, and this cell can be only used by communication network service providers but cannot be used by typical users.

With regard to the service types provided by a cell, the type of a cell can be divided as follows.

1) Acceptable cell: A cell in which the UE can receive a limited service. This cell is not barred and satisfies the cell selection criteria of the UE from a standpoint of the corresponding UE.

2) Suitable cell: A cell in which the UE can receive a normal service. This cell satisfies the condition of an acceptable cell, and at the same time satisfies additional conditions. For additional conditions, the cell should be attached to PLMN to which the corresponding UE can be accessed, and it should be a cell in which the implementation of a tracking area update procedure by the UE is not barred. If the relevant (or corresponding) cell is a CSG cell, then it should be a cell that can be accessed by the UE as a CSG member.

3) Barred cell: A cell broadcasting information that it is a barred cell through the system information.

4) Reserved cell: A cell broadcasting that it is a reserved cell through the system information.

Hereinafter, Closed Subscriber Group (CSG) will be described.

A base station which provides CSG service is called a Home Node B (HNB) or Home eNB (HeNB) in 3GPP. Hereinafter, both the HNB and HeNB are commonly designated as a HNB. An object of the HNB is basically to provide specialized services only to a member of the CSG. However, those services may be provided to other users in addition to the CSG depending on the operation mode setting of the HNB.

Figure 4:
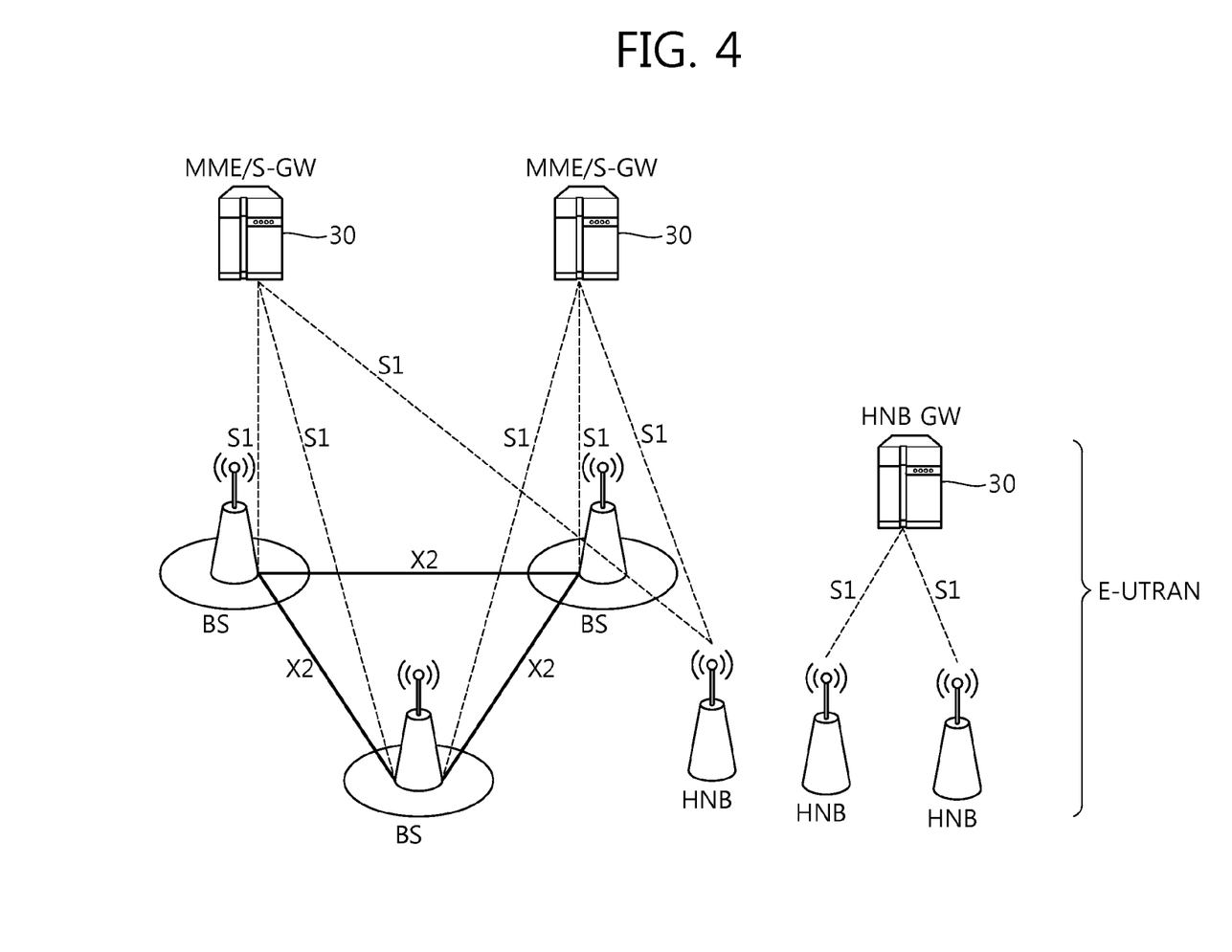
FIG. 4 is an exemplary view illustrating a network architecture for managing an HNB by using an HNB gateway.

FIG. 4 is an exemplary view illustrating a network architecture for managing an HNB by using an HNB gateway (GW).

HNBs may be connected to EPC via HNB GW or directly connected to EPC. Here, the HNB GW is regarded as a typical BS to MME. Also, the HNB GW is regarded as the MME to the HNB. Therefore, an S1 interface is connected between HNB and HNB GW, and also an S1 interface is connected between the HNB GW and the EPC. Furthermore, even in case of directly connecting between HNB and EPC, it is connected via an S1 interface. The function of HNB is almost similar to the function of a typical BS.

In general, HNB has a low radio transmission output power compared to the BS owned by mobile communication service providers. Therefore, the service coverage provided by HNB is typically smaller than the service coverage provided by (e)NB. Due to such characteristics, the cell provided by HNB is classified as a femto cell in contrast to a macro cell provided by (e)NB from a standpoint of the service coverage.

From a standpoint of provided services, when HNB provides those services only to a CSG group, the cell provided by this HNB is referred to as a CSG cell.

Each CSG has its own identifier which is called a CSG ID (CSG identity). The UE may have a CSG list to which the UE itself belongs as a member thereof, and this CSG list may be changed by a request of the UE or a command of the network. In the current specification of the 3GPP, one HNB may support one CSG.

A UE has a list of CSGs to which the UE belongs as a member. This list is called as a CSG white list.

A HNB delivers the CSG ID of the CSG being supported by itself through the system information, thereby allowing only the corresponding CSG member UE to be accessed. When a CSG cell is found by the UE, what CSG being supported by this CSG cell can be checked by reading the CSG ID included in the system information. The UE that has read the CSG ID regards the corresponding cell as an accessible cell only if the UE itself is a member of the corresponding CSG cell or the CSG corresponding to the CSG ID is included in the UE's CSG white list.

It is not always required for HNB to allow only the CSG UE to be accessed. Based on the configuration setting of HNB, non-CSG member UE may be allowed to be accessed. The type of UE allowed to be accessed may be changed based on the configuration setting of HNB. Here, the configuration setting denotes the setting of the access mode (or may be called as operation mode) of HNB. The access mode of HNB can be divided into three types as follows based on the type of UE.

1) Closed access mode: A mode in which services are provided to particular CSG members only. A CSG cell is provided by the HNB.

2) Open access mode: A mode in which services are provided without any restriction of particular CSG members like typical (e)NB. The HNB provides a typical cell not a CSG cell. For clarity, a macro cell is a cell operated by the open access mode.

3) Hybrid mode: A mode in which CSG services are provided to particular CSG members and also services are provided to non-CSG members like a typical cell. It is recognized as a CSG cell for the CSG member UE, and recognized as a typical cell for the non-CSG member UE. This cell is called a hybrid cell.

HNB notifies the UE that the cell being serviced by itself is a CSG cell or typical cell, allowing the UE to know whether or not it can be accessed to the corresponding cell. HNB being managed in a closed access mode broadcasts via the system information that it is a CSG cell. In this manner, HNB allows the system information to include a CSG indicator indicating whether or not the cell being serviced by itself is a CSG cell in the system information.

For example, the CSG cell broadcasts by setting the CSG indicator to 'TRUE'. If the cell being serviced is not a CSG cell, then it may be used a method that the CSG indicator may be set to 'FALSE' or the transmission of the CSG indicator is omitted. The UE should distinguish a typical cell from a CSG cell, and thus a typical BS may also transmit the CSG indicator (for example, the CSG indicator set to 'FALSE'), thereby allowing the UE to know that the cell type provided by itself is a typical cell. Furthermore, the typical BS may not transmit the CSG indicator, thereby allowing the UE to know that the cell type provided by itself is a typical cell, too.

The CSG-related parameters transmitted by the corresponding cell for each cell type are represented in Table 1. The CSG-related parameters may be transmitted via system information.

TABLE 1

|  | CSG Cell | Typical Cell |
| --- | --- | --- |
| CSG Indicator | 'CSG Cell' is indicated | 'Non-CSG cell' is indicated, or not transmitted |
| CSG ID | Supported CSG ID is transmitted | Not transmitted |

The types of UE allowed to be accessed for each cell type are represented in Table 2.

TABLE 2

|  | CSG Cell | Typical Cell |
| --- | --- | --- |
| UE not supporting CSG | Access denied | Access accepted |
| Non-CSG member UE | Access denied | Access accepted |
| CSG member UE | Access accepted | Access accepted |

Figure 5:
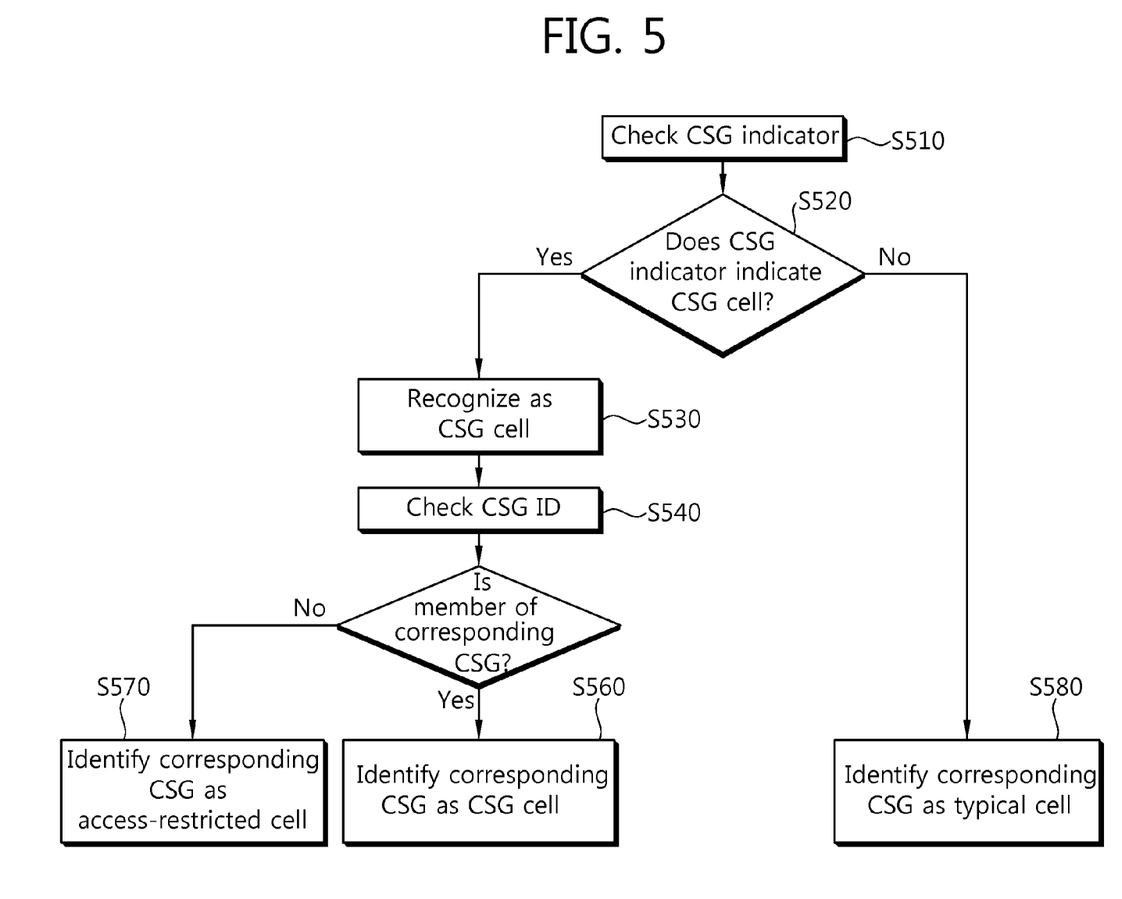
FIG. 5 is a flowchart illustrating a method of checking the access mode of a base station by the UE.

FIG. 5 is a flowchart illustrating a method of checking the access mode of a base station by the UE.

A UE checks a CSG indicator in system information of a target cell in order to confirm what is the type of the target cell (S510).

After checking the CSG indicator, if the CSG indicator indicates that the target cell is a CSG cell, then the UE recognizes the corresponding cell as the CSG cell (S520, S530). The UE checks the CSG ID in the system information in order to check whether or not the UE itself is a CSG member of the target cell (S540).

If it is checked from the CSG ID that the UE is a CSG member of the target cell, then the corresponding cell will be recognized as an accessible CSG cell (S550, S560). If it is checked from the CSG ID that the UE is not a CSG member of the target cell, then the corresponding cell will be recognized as an inaccessible CSG cell (S550, S570).

If the CSG indicator indicates that the target cell is not a CSG cell, then the UE recognizes the target cell as a typical cell (S520, S580). Furthermore, if the CSG indicator is not transmitted in the step S510, the UE recognizes the object cell as a typical cell.

In general, CSG cells and macro cells may be concurrently managed in a particular frequency. A CSG dedicated frequency is a frequency in which CSG cells exist only. A mixed carrier frequency is a frequency in which CSG cells and macro cells exist. The network may reserve a physical layer cell identifier for the CSG cell in a mixed carrier frequency. The physical layer cell identifier is called a Physical Cell Identity (PCI) in E-UTRAN, and called a Physical Scrambling Code (PSC) in UTRAN. For clarity, the physical layer cell identifier will be expressed by PCI.

The CSG cell notifies information on the PCI reserved for CSG cell at a current frequency via the system information. The UE received this information can determine whether or not this cell is a CSG cell from the PCI of the cell when a certain cell is found at the corresponding frequency. How this information being used by the UE will be illustrated below in case of two types of UE.

First, in case of the UE, not supporting the CSG-related function or having no CSG list to which the UE itself belongs, the UE does not need to regard a CSG cell as a selectable cell during the cell selection/reselection process or handover. In this case, the UE checks only the PCI of the cell, and then the UE may immediately eliminate the corresponding cell during the cell selection/reselection process or handover if the PCI is a reserved PCI for CSG. Typically, the PCI of a certain cell may be immediately known during a process of checking the existence of the corresponding cell in a physical layer by the UE.

Second, in case of the UE having a CSG list to which the UE itself belongs, when the UE wants to know a list of the neighboring CSG cells at a mixed carrier frequency it may be known that the corresponding cell is a CSG cell if only a cell having the PCI reserved for CSG is found, instead of individually checking the CSG identity of the system information of every cell found in the whole PCI range.

A CSG member UE is a CSG members that can be serviced in a CSG cell. Therefore, the CSG member UE may need to be provided with higher QoS than or at least the same QoS as a non-CSG member UE. Thus, if a CSG member UE competes with a non-CSG member UE for access to an HNB, the HNB may give higher priority to the CSG member UE than to the non-CSG member UE.

When an HNB operates in an hybrid mode, not only a CSG member UE but also a non-CSG member UE may attempt to access the HNB at the same time. However, the HNB cannot determine whether a UE attempting to access it is the CSG member UEs or the non-CSG member UE. When there are multiple UEs attempting to access the HNB, the HNB may determine that the radio resources are not sufficient, and may restrict UEs' access. The HNB may accept or reject UEs' access regardless of whether the UE is the CSG member UE or non-CSG member UE.

Figure 6:
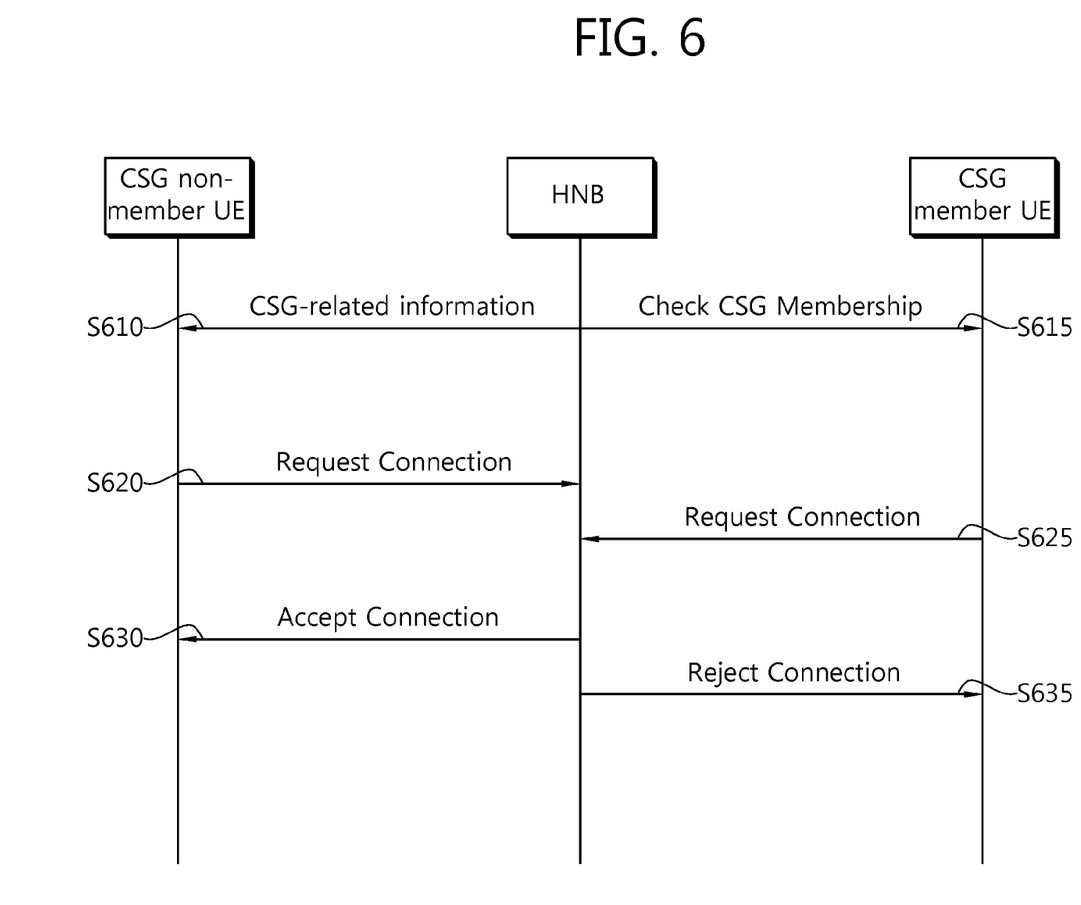
FIG. 6 illustrates an example of how a UE accesses a BS.

FIG. 6 illustrates an example of how a UE accesses a BS.

An HNB transmits CSG-related information to a CSG member UE and a non-CSG member UE in its cell (S610 and S611). The CSG-related information may include a CSG indicator and a CSG ID.

The CSG member UE checks CSG membership (S615). The CSG member UE may identify themselves as CSG members of the HNB based on the CSG ID (S615). The non-CSG member UE transmits a connection request to the HNB (S620). The CSG member UE also transmits a connection request to the HNB (S625).

Since the HNB cannot determine which of the UEs requesting access thereto are CSG member UEs, the HNB may accept the non-CSG member UE's access request (S630), and may reject the CSG member UE's access request (S635).

As a result, the HNB may happen to prioritize the non-CSG member UE over the CSG member UE, which is inappropriate given that the HNB is supposed to provide better quality services to the CSG member UE than to the non-CSG member UE.

Figure 7:
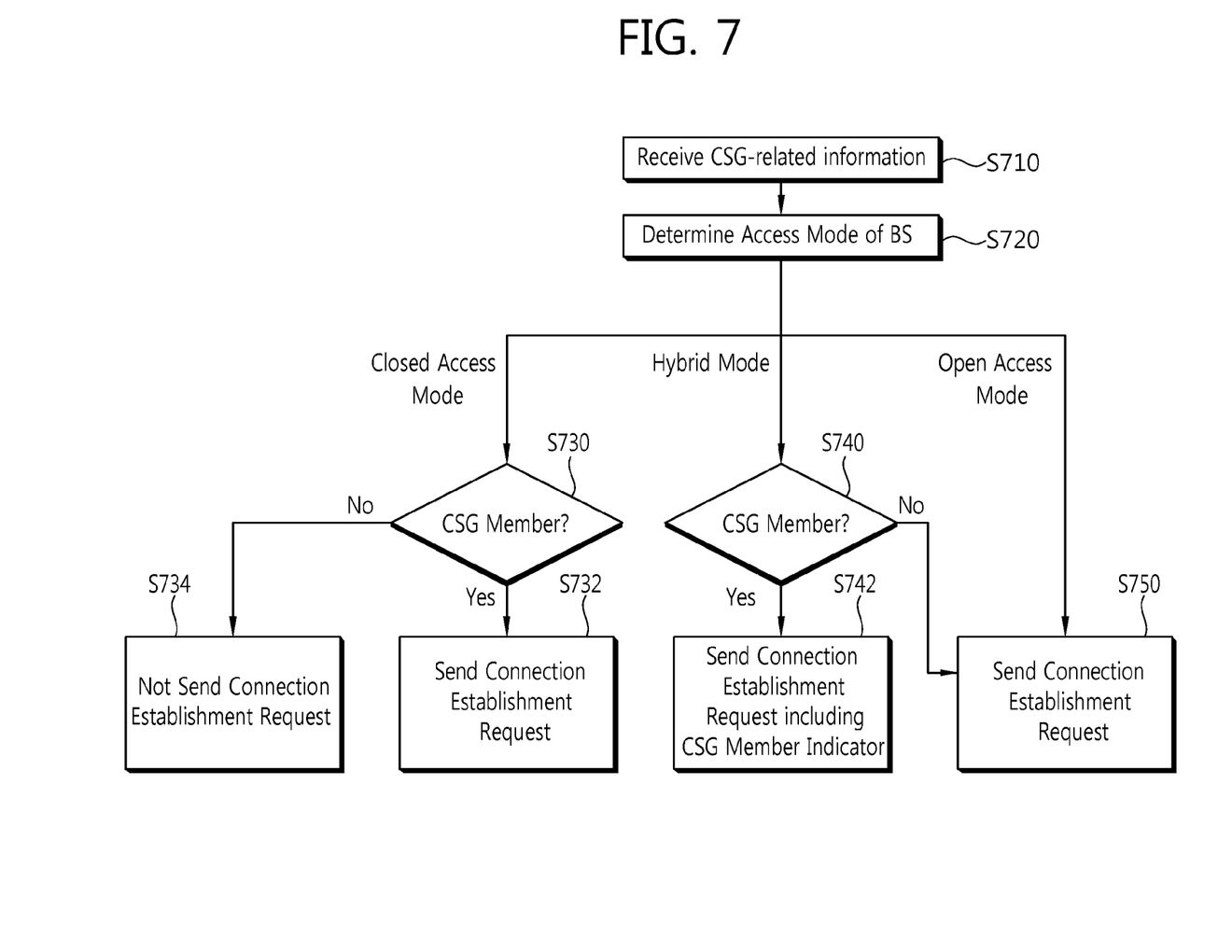
FIG. 7 illustrates an operation of a UE according to an exemplary embodiment of the present invention.

FIG. 7 illustrates an operation of a UE according to an exemplary embodiment of the present invention.

A UE may receives CSG-related information from a BS (S710). The CSG-related information may include a CSG indicator and a CSG ID.

The UE determines the access mode of the BS based on the CSG-related information (S720).

Table 3 below shows an example of how to determine the access mode of the BS based on the CSG-related information.

TABLE 3

| | Closed Access Mode | Open Access Mode | Hybrid Mode |
|---|---|---|---|
| CSG Indicator | 'CSG Cell' is indicated | 'Non-CSG cell' is indicated, or not transmitted | 'Non-CSG cell' is indicated, or not transmitted |
| CSG ID | ID of CSG supported | Not transmitted | ID of CSG supported |

In Table 3, the expression 'not transmitted' means transmitting no value at all, or transmitting a NULL value or a specific value.

If the access mode of the BS is the closed access mode, the UE may determine whether the UE is a CSG member UE (S730). If the UE is the CSG member UE, the UE may transmit a connection establishment request to the BS (S732). On the other hand, if the UE is a non-CSG member UE, the UE may not transmit the connection establishment request (S732). When the access mode of the BS is the closed access mode, only CSG member UEs may send a request access to the BS.

If the access mode of the BS is the hybrid mode, the UE may determine whether the UE is a CSG member UE (S740). If the UE is the CSG member UE, the UE may transmit a connection establishment request including a CSG member indicator to the BS (S742). On the other hand, if the UE is a non-CSG member UE, the UE may transmit a connection establishment request to the BS (S750). When the access mode of the BS is the hybrid mode, a CSG member UE may transmit its CSG member indicator to the BS while requesting access to the BS.

If the access mode of the BS is the open access mode, the UE may transmit a connection establishment request to the BS regardless of whether the UE is a CSG member or not (S750).

When the BS operates in the hybrid mode, the UE may indicate whether the UE is a CSG member or not by sending a message requesting access to the BS. The BS can determine whether the UE attempts to access it as a CSG member or as a non-CSG member. Therefore, the BS may give priority to the CSG member UE according to access policy.

If the BS can serve both CSG member UE and non-CSG member UE, the UE may transmit a CSG member indicator indicating its CSG membership to the BS.

The CSG member indicator may indicate whether the UE is a CSG member UE or not, and may be 1-bit long.

The UE may send the CSG member indicator when sending a connection establishment request or a connection re-establishment request to the BS.

For example, the CSG member indicator may be included in an RRC connection setup request message or an RRC connection setup complete message for use in RRC connection establishment, which is specified in clause 5.3.3 of 3GPP TS 36.331 V8.4.0 (2008-12). The CSG member indicator may be added as a new field to the RRC connection setup request message or the RRC connection setup complete message or may reuse an existing field of the RRC connection message or the RRC connection setup complete message.

Alternatively, the CSG member indicator may be included in an RRC connection re-establishment request message or an RRC connection re-establishment complete message, which is specified in clause 5.3.7 of 3GPP TS 36.331 V8.4.0 (2008-12). In this case, a CSG member indicator may be added as a new field to the RRC connection re-establishment request message or the RRC connection re-establishment complete message or may reuse an existing field of the RRC connection re-establishment request message or the RRC connection re-establishment complete message.

Still alternatively, the CSG member indicator may be transmitted via a random access preamble. For example, if there are 64 random access preambles available, some of the 64 random access preambles may be defined to represent the CSG membership. The UE may select one of the random access preambles which can represent the CSG membership and may transmit the selected random access preamble to the BS, thereby notifying the BS that the UE is a CSG member.

Still alternatively, a CSG member indicator may be transmitted via a NAS message.

If CSG-related information includes a plurality of CSG IDs, the CSG member indicator may be represented as a plurality of bits (i.e., a bitmap) for indicating what CSG the UE belongs to. In this case, each of the plurality of bits may be associated with each CSG ID received from the BS. For example, if the UE receives two CSG IDs, i.e., CSG ID1 and CSG ID2, the UE may represent the CSG member indicator as '01'. The first bit value of 0 indicates that the UE is not the member of CSG ID1 and the second bit value of 1 indicates that the UE is the member of CSG ID2.

A CSG member indicator may be transmitted to the BS when the UE requests access to the BS. In addition, a CSG member indicator may be transmitted to the BS when there is the request of the BS.

Figure 8:
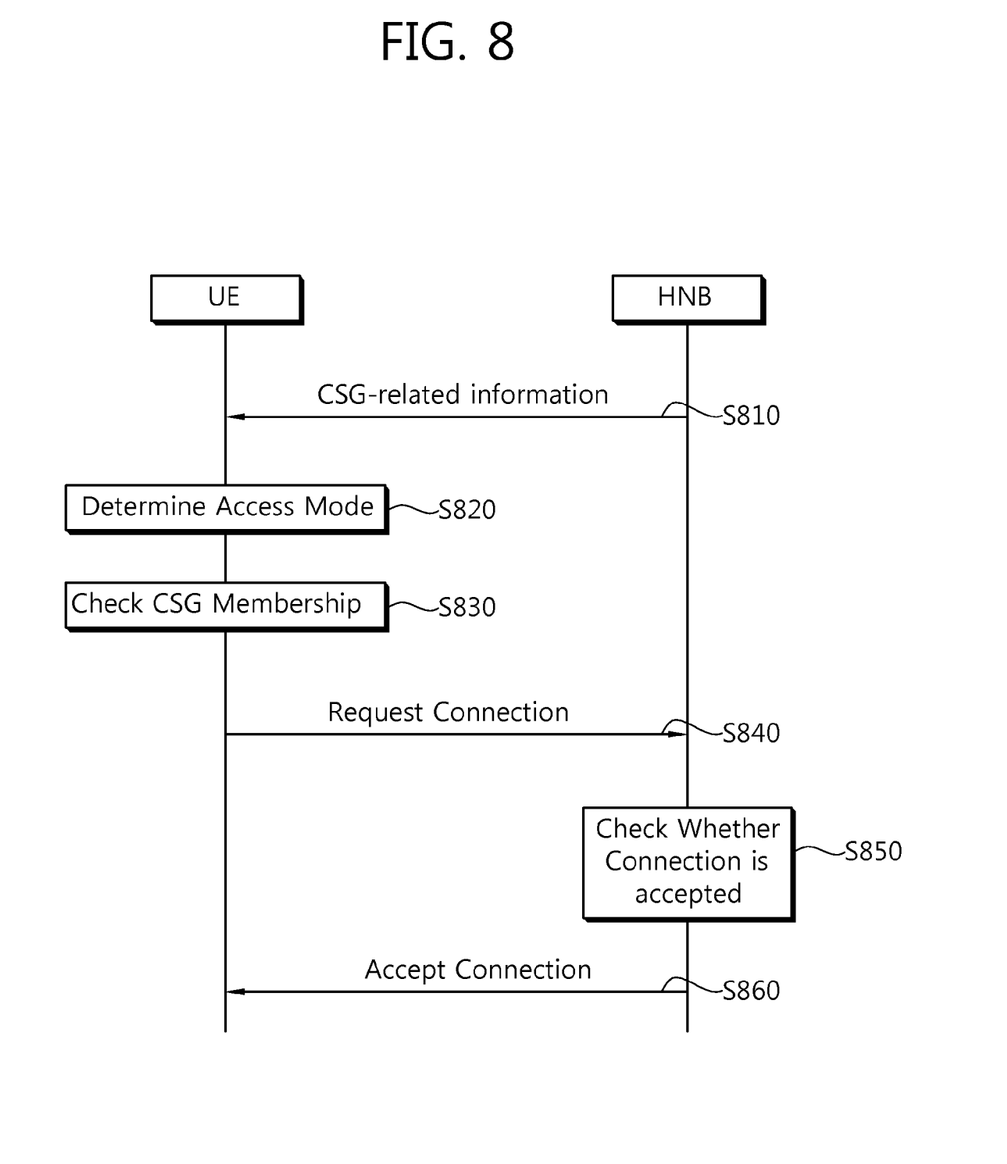
FIG. 8 illustrates a method of supporting a CSG service according to an exemplary embodiment of the present invention.

FIG. 8 illustrates a method of supporting a CSG service according to an exemplary embodiment of the present invention.

A UE receives CSG-related information including a CSG indicator and a CSG ID from an HNB (S810). The CSG-related information may be received via system information or an upper layer message.

The UE determines the access mode of the HNB based on the CSG-related information (S820).

If the HNB serves as a CSG cell, the UE may check its CSG membership (S830).

If the UE is a CSG member of the HNB, the UE may transmit a connection request message to the HNB (S840). The HNB determines whether to accept the UE's connection request (S850). If the connection request message transmitted by the UE includes a CSG member indicator indicating that the UE is a CSG member of the HNB, the HNB may determine that the UE is a CSG member UE. On the other hand, if the connection request message transmitted by the UE includes a CSG member indicator indicating that the UE is not a CSG member of the HNB, the HNB may determine that the UE is a non-CSG member UE. When operating in the hybrid mode or the closed access mode, the HNB can check the UE's CSG membership based on the CSG member indicator transmitted by the UE.

The HNB notifies the UE the acceptance of the connection (S860).

A BS can determine whether a UE attempts to access it as a CSG member UE or as a non-CSG member UE.

When radio resources are not sufficient to handle multiple UEs' attempts to access a BS, it is possible to restrict access to the BS by accepting only CSG member UE's access request while rejecting non-CSG member UE's access request. In this manner, it is possible to give higher priority to the CSG member UE than to the non-CSG member UE during cell access stage or connection setup stage.

Even after the cell access stage or connection setup stage, a BS can effectively manage network resources using CSG member/non-member information of UEs and can thus guarantee better QoS for the CSG member UE than for non-CSG member UE.

In addition, it is possible for a BS to optimally determine its access mode. For example, when a BS operates in the hybrid mode and there are multiple UEs attempting to access the BS as CSG member UEs, the BS may switch its access mode to the hybrid mode or the closed access mode and may thus be able to focus on providing better-quality services to its CSG member UEs.

A network supporting a CSG service can provide better-quality services to the CSG member UE than to the non-CSG member UEs even at the beginning of a cell access stage or connection setup stage.

Figure 9:
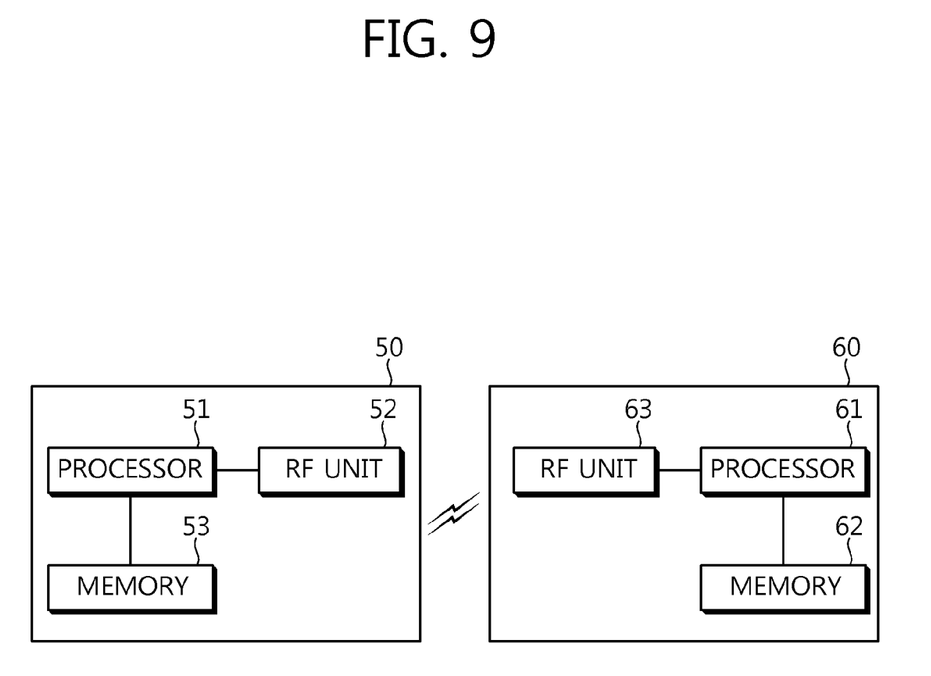
FIG. 9 is a block diagram showing wireless communication system to implement an embodiment of the present invention.

FIG. 9 is a block diagram showing wireless communication system to implement an embodiment of the present invention. A BS 50 may include a processor 51, a memory 52 and a radio frequency (RF) unit 53. The memory 52 is operatively coupled with the processor 51 and stores a variety of information to operate the processor 51. The RF unit 53 is operatively coupled with the processor 11, and transmits and/or receives a radio signal.

The processor 51 may be configured to implement proposed functions, procedures and/or methods described in this description. Layers of the radio interface protocol may be implemented in the processor 51. The processor 51 may send CSG related information and determine the access of the UE based on a CSG member indicator.

A UE 60 may include a processor 61, a memory 62 and a RF unit 63. The memory 62 is operatively coupled with the processor 61 and stores a variety of information to operate the processor 61 and a CSG white list. The RF unit 63 is operatively coupled with the processor 61, and transmits and/or receives a radio signal.

The processor 61 may be configured to implement proposed functions, procedures and/or methods described in this description. The processor 61 may check CSG membership based on the CSG-related information and sends a access request which represent CSG membership.

The processors 51, 61 may include application-specific integrated circuit (ASIC), other chipset, logic circuit and/or data processing device. The memories 52, 62 may include read-only memory (ROM), random access memory (RAM), flash memory, memory card, storage medium and/or other storage device. The RF units 53, 63 may include baseband circuitry to process radio frequency signals. When the embodiments are implemented in software, the techniques described herein can be implemented with modules (e.g., procedures, functions, and so on) that perform the functions described herein. The modules can be stored in memories 52, 62 and executed by processors 51, 61. The memories 52, 62 can be implemented within the processors 51, 61 or external to the processors 51, 61 in which case those can be communicatively coupled to the processors 51, 61 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A wireless apparatus for supporting a closed subscriber group (CSG) service in a wireless communication system, the apparatus comprising:
    a radio frequency (RF) unit configured to transmit and receive radio signals;
    a memory configured to store a CSG white list including a list of CSGs to be subscribed; and
    a processor configured to be operatively coupled to the RF unit and the memory and to implement a radio interface protocol,
    wherein the processor is further configured to:
    determine an access mode of a base station (BS); and
    transmit a connection establishment request message to the BS if the access mode of the BS is a hybrid mode allowing access by a member user and by a non-member user, and
    wherein the connection establishment request message comprises a CSG member indicator indicating whether the wireless apparatus is a CSG member of the BS.

2. The wireless apparatus of claim 1,
    wherein the processor is further configured to:
    acquire CSG-related information from the BS, the CSG-related information including at least a CSG indicator or a CSG identity (ID), and
    wherein determining the access mode of the BS comprises:
    determining that the access mode of the BS is the hybrid mode if the CSG ID is included in the CSG-related information and either the CSG indicator is not included in the CSG-related information or the CSG indicator indicates that the access mode of the BS is a non-CSG mode.

3. The wireless apparatus of claim 2,
    wherein determining the access mode of the BS further comprises:
    determining that the access mode of the BS is a CSG mode if the CSG indicator is included in the CSG-related information and indicates that the access mode of the BS is the CSG mode.

4. The wireless apparatus of claim 3, wherein the processor is further configured to:
    determine whether the wireless apparatus is a CSG member of the BS based on the CSG ID and the CSG white list.

5. The wireless apparatus of claim 4,
    wherein the processor is further configured to:
    transmit a connection reestablishment request message to the BS if the access mode of the BS is the CSG mode and the wireless apparatus is a CSG member of the BS, and
    wherein the connection reestablishment request message does not include the CSG member indicator.

6. The wireless apparatus of claim 4,
    wherein the CSG member indicator indicates that the wireless apparatus is a CSG member of the BS if the access mode of the BS is the hybrid mode and the wireless apparatus is a CSG member of the BS.

7. The wireless apparatus of claim 6,
    wherein the CSG member indicator indicates that the wireless apparatus is not a CSG member of the BS if the access mode of the BS is the hybrid mode and the wireless apparatus is not a CSG member of the BS.

8. The wireless apparatus of claim 1, wherein the connection establishment request message comprising the CSG member indicator is at least a radio resource control (RRC) connection setup request message, an RRC connection setup complete message, an RRC connection re-establishment request message or an RRC connection re-establishment complete message.

9. A method of supporting a closed subscriber group (CSG) service in a wireless communication system, the method comprising:
    determining, at a user equipment (UE), an access mode of a base station (BS); and
    transmitting, at the UE, a connection establishment request message to the BS if the access mode of the BS is a hybrid mode allowing access by a member user and by a non-member user,
    wherein the connection establishment request message comprises a CSG member indicator indicating whether the UE is a CSG member of the BS.

10. The method of claim 9, further comprising acquiring CSG-related information from the BS, the CSG-related information including at least a CSG indicator or a CSG identity (ID),
    wherein determining the access mode of the BS comprises determining that the access mode of the BS is the hybrid mode if the CSG ID is included in the CSG-related information and either the CSG indicator is not included in the CSG-related information or the CSG indicator indicates that the access mode of the BS is a non-CSG mode.

11. The method of claim 9, wherein the connection establishment request message is at least a radio resource control (RRC) connection setup request message, an RRC connection setup complete message, an RRC connection re-establishment request message or an RRC connection re-establishment complete message.

12. A base station (BS) for supporting a closed subscriber group (CSG) service in a wireless communication system, the BS comprising:
    a radio frequency (RF) unit configured to transmit and receive radio signals; and
    a processor configured to be operatively coupled to the RF unit and to implement a radio interface protocol,
    wherein the processor is further configured to:
    transmit CSG-related information including at least a CSG indicator or a CSG identity (ID);
    receive from a user equipment (UE) a connection establishment request message if the BS is operating in a hybrid mode, the connection establishment request message including a CSG member indicator indicating whether the UE is a CSG member of the BS; and
    determine whether to accept a request of the connection establishment request message based on the CSG member indicator.

13. The BS of claim 12, wherein the processor is further configured to give higher priority to the UE than to other non-CSG member UEs if the BS is operating in the hybrid mode and the UE is a CSG member of the BS.

* * * * *